(12) United States Patent
Wang et al.

(10) Patent No.: US 8,356,311 B2
(45) Date of Patent: Jan. 15, 2013

(54) DETECTING METHOD FOR LIMIT SWITCH OF OPTICAL DISC DRIVE BY SAMPLING VOLTAGE OF LIMIT SWITCH PREDETERMINED TIMES

(75) Inventors: Yu-Sheng Wang, Taoyuan County (TW); Jen-Chen Wu, Taoyuan County (TW)

(73) Assignee: Quanta Storage Inc., Guishan Shiang, Taoyuan County (TW)

( * ) Notice: Subject to any disclaimer, the term of this patent is extended or adjusted under 35 U.S.C. 154(b) by 2 days.

(21) Appl. No.: 13/227,462

(22) Filed: Sep. 7, 2011

(65) Prior Publication Data
US 2012/0096480 A1    Apr. 19, 2012

(30) Foreign Application Priority Data

Oct. 14, 2010   (TW) .............................. 99135171 A

(51) Int. Cl.
G11B 17/04 (2006.01)
(52) U.S. Cl. ...................................................... 720/602
(58) Field of Classification Search .................. 720/602
See application file for complete search history.

(56) References Cited

U.S. PATENT DOCUMENTS

| 7,296,277 | B2 * | 11/2007 | Ohno et al. | 720/602 |
| 7,814,508 | B2 * | 10/2010 | Fujisawa | 720/713 |
| 2006/0271943 | A1 * | 11/2006 | Nishide | 720/602 |
| 2008/0005753 | A1 * | 1/2008 | Fujisawa | 720/604 |
| 2008/0109833 | A1 * | 5/2008 | Hung | 720/606 |

* cited by examiner

Primary Examiner — Mark Blouin
(74) Attorney, Agent, or Firm — Winston Hsu; Scott Margo

(57) ABSTRACT

A method is disclosed to detect the voltage of a limit switch in an optical disc drive. The method includes following steps: loading an optical disc when the voltage of the limit switch is at a high level, completing the disc loading process when the voltage is changed to a low level, sampling the voltage of the limit switch predetermined times when the voltage is changed to the high level again, detecting the sampling voltages, completing the disc ejecting process when the sampling voltages are all at the high level, and determining a voltage bouncing to maintain the disc loaded status to avoid disc ejection misjudgment of the optical disc drive when the sampling voltages are not all at the high level.

10 Claims, 6 Drawing Sheets

DETECTING METHOD FOR LIMIT SWITCH OF OPTICAL DISC DRIVE BY SAMPLING VOLTAGE OF LIMIT SWITCH PREDETERMINED TIMES

BACKGROUND OF THE INVENTION

1. Field of the Invention

The disclosed embodiments of the present invention relate to an optical disc drive, and more particularly, to a detecting method that checks if a voltage of a limit switch of an optical disc drive is changed to a high/low level to detect the action of the limit switch.

2. Description of the Prior Art

An optical disc drive accesses data of an optical disc by rotating the optical disc with high speed. To avoid damaging the optical disc, it is necessary to judge correctly that the loaded optical disc has arrived at the right position before rotating the optical disc. Moreover, to ensuring the safety in use, it is also necessary to confirm that the optical disc drive is ready for disc ejection before allowing the optical disc drive to eject the loaded optical disc.

Please refer to FIG. 1 together with FIG. 2. FIG. 1 is a diagram illustrating a cross-section of a conventional optical disc drive 1. Sub-diagrams in FIG. 2 illustrate voltage variations of a limit switch of the conventional optical disc drive 1. A tray 3 is disposed inside a hollow enclosure 2 of the conventional optical disc drive 1, a panel 4 is disposed in front of the tray 3 to shield an opening of the enclosure 2, and an ejection button 5 is disposed on the panel 4. An optical disc 6 is loaded on the tray 3, and the tray 3 may slide in or slide out through the opening of the enclosure 2. A spindle motor 7 is disposed in the center of the tray 3 to clamp and rotate the optical disc 6, and a pick-up head 8 is also disposed for moving back and forth along the radial direction of the optical disc 6 for accessing data of the optical disc 6. One end of a cable 9 is connected to the back of the tray 3, and the other end of the cable 9 is connected to a motherboard 10 disposed at the back of the inner side of the enclosure 2. A limit switch 11 is disposed on the motherboard 10. An elastic element 12 is disposed at the back end of the tray 3, and a locking device 13 is disposed at the lower edge of the front end of the tray 3. An electrical valve 14 is linked to the locking device 13 for hooking or releasing a latch 15 disposed on the enclosure 2.

When a disc loading process begins, the tray 3 carries the optical disc 6 and moves into the enclosure 2, and then the back end of the tray 3 presses the elastic element 12 such that the locking device 13 hooks the latch 15 and the tray 3 is locked in the enclosure 2. Meanwhile, the bottom of the tray 3 presses the limit switch 11 and then activates the limit switch 11. As shown in the sub-diagram (a) in FIG. 2, a voltage of the limit switch 11 is changed from a high level representative of a release status to a low level representative of an action status. Upon detecting that the voltage of the limit switch 11 is at the low level, the disc drive 1 confirms that the optical disc 6 has arrived at the right position, and then completes a disc loading process. Regarding a disc ejecting process, a user may manually push the ejection button 5 to make the voltage of the limit switch 11 changed from the low level to the high level, or the optical disc drive that completes an access command may automatically make the voltage of the limit switch 11 changed from the low level to the high level. As the optical disc drive 1 detects that the voltage of the limit switch 11 is at the high level and thus confirms that ejecting the loaded disc is needed, the disc ejecting process is completed. Meanwhile, the electrical valve 14 makes the linked locking device 13 released from the latch 15, and allows the elastic element 12 to eject the tray 3 from the enclosure 2. As a result, the bottom of the ejected tray 3 releases the limit switch 11, and the voltage of the limit switch 11 maintains the high level.

However, the limit switch 11 of the conventional optical disc drive 1 is very likely to be contaminated or oxidized by the suspended particles in the air, resulting in an abnormal voltage bouncing phenomenon of the voltage of the limit switch 11, as shown in sub-diagram (b) in FIG. 2. The voltage bouncing phenomenon occurs more often when the optical disc drive operates in the high temperature/humidity environment, or in a car driving environment with violent shaking. When the voltage of the limit switch 11 bounces, the optical disc drive which has completed the disc loading process misjudges that it needs to eject the loaded optical disc once detecting the voltage of the limit switch of the optical disc drive changed to the high level, and then stops disc access immediately to begin the disc ejecting process, which makes the optical disc drive load and eject the optical disc frequently and affects the access reliability and efficiency of the optical disc drive. Therefore, detection of the voltage status of activation or release of the limit switch in the conventional optical disc drive still has problems to be solved.

SUMMARY OF THE INVENTION

It is an objective of the present invention to provide a detection method for a limit switch of an optical disc drive. When detecting that the limit switch is released, the method samples a voltage of the limit switch predetermined times rather than executes a disc ejecting process immediately. When sampled voltages are all at a high level, it is thus confirmed that the limit switch is released, which may prevent the optical disc drive from misjudging that disc ejection is required and enhance the reliability of the optical disc drive.

It is another objective of the present invention to provide a detection method for a limit switch of an optical disc drive. By sampling a voltage of the limit switch predetermined times continuously to make a sampling period of sampling the voltage continuously is longer than a longest voltage bouncing period, which may prevent the optical disc drive from misjudging that disc ejection is required.

It is further an objective of the present invention to provide a detection method for a limit switch of an optical disc drive. The method samples a voltage of the limit switch, and performs voltage detection on the sampled voltage each time the voltage is sampled. Once the sampled voltage is detected to be at a low level, the method stops ejecting an optical disc and sampling the voltage, thereby enhancing the efficiency of the optical disc drive.

In order to achieve the above objectives, a detecting method for a limit switch of an optical disc drive according to the present invention includes: loading an optical disc when a voltage of the limit switch of the optical disc drive is at a high level; completing a disc loading process when detecting that the voltage of the limit switch is changed to a low level; and sampling the voltage of the limit switch predetermined times when detecting that the voltage of the limit switch is changed to the high level again, wherein if sampled voltages are not all at the high level, the optical disc drive maintains at a disc loaded status, and if the sampled voltages are all at the high level, the optical disc drive executes and completes a disc ejecting process.

A sampling interval for sampling the voltage predetermined times may be fixed or unfixed, and the step of sampling the voltage may sample the voltage predetermined times continuously without any sampling interval, where a total sampling period of sampling the voltage predetermined times continuously is longer than a longest voltage bouncing period. The limit switch is determined to have abnormal voltage bouncing when the sampled voltages are not all at the high level, and the limit switch is determined to be released when the sampled voltages are all at the high level. In addition, voltage detection may be performed upon the sampled voltages collectively or individually in turn. As long as a voltage at non-high level is detected each time voltage detection is performed, the sampled voltages are determined to be not all at a high level. Thus, follow-up voltage sampling is stopped, and the optical disc drive maintains at the disc loaded status.

These and other objectives of the present invention will no doubt become obvious to those of ordinary skill in the art after reading the following detailed description of the preferred embodiment that is illustrated in the various figures and drawings.

DETAILED DESCRIPTION

With regard to technical means and utilities thereof used to achieve the above objectives of the present invention, preferred embodiments are described as follows by way of examples and with reference to the accompanying diagrams.

Figure 1:
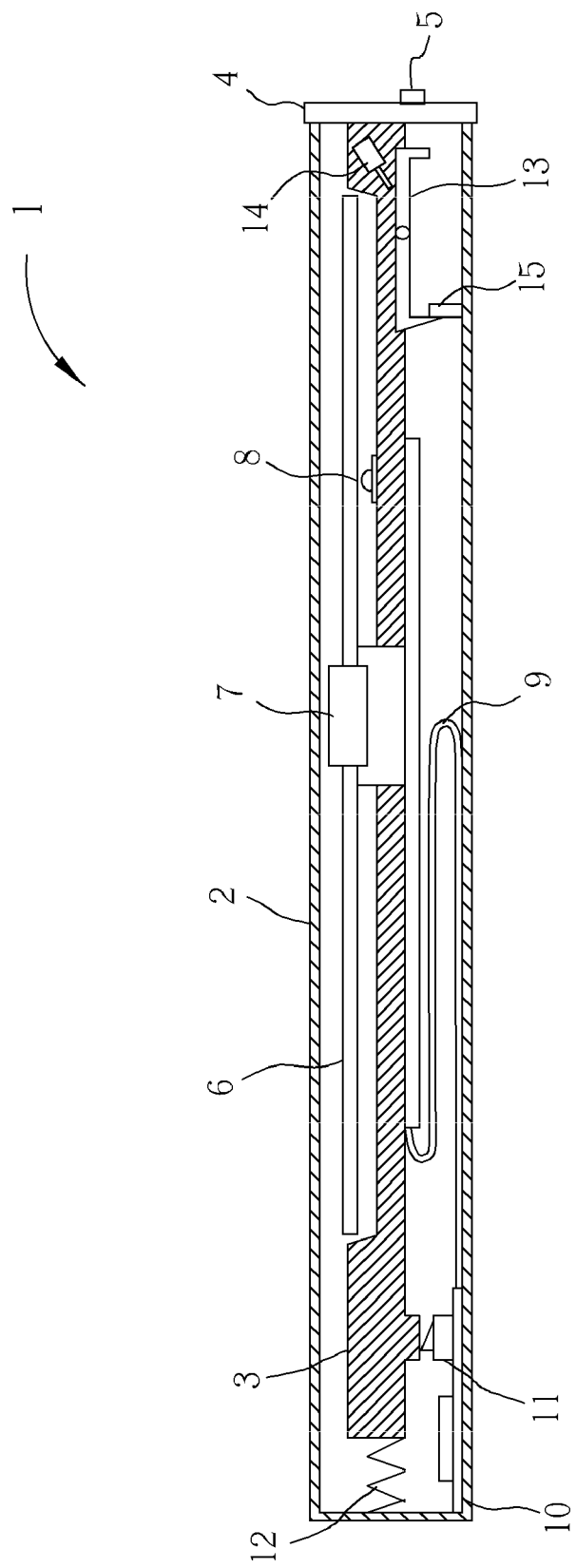
FIG. 1 is a diagram illustrating a cross-section of a conventional optical disc drive.
Figure 2:
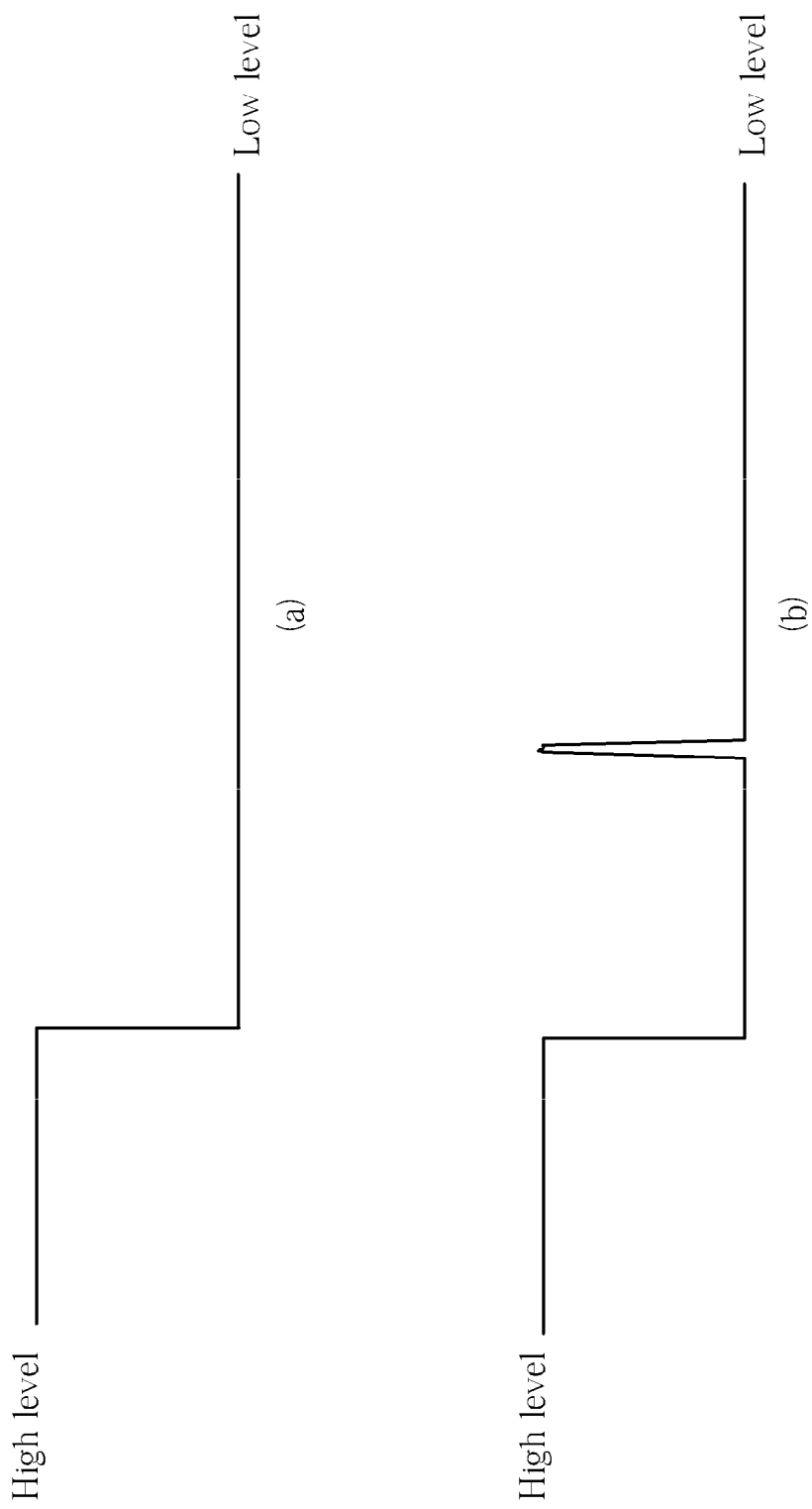
FIG. 2 is diagram illustrating voltage variations of a limit switch of the conventional optical disc drive.
Figure 3:
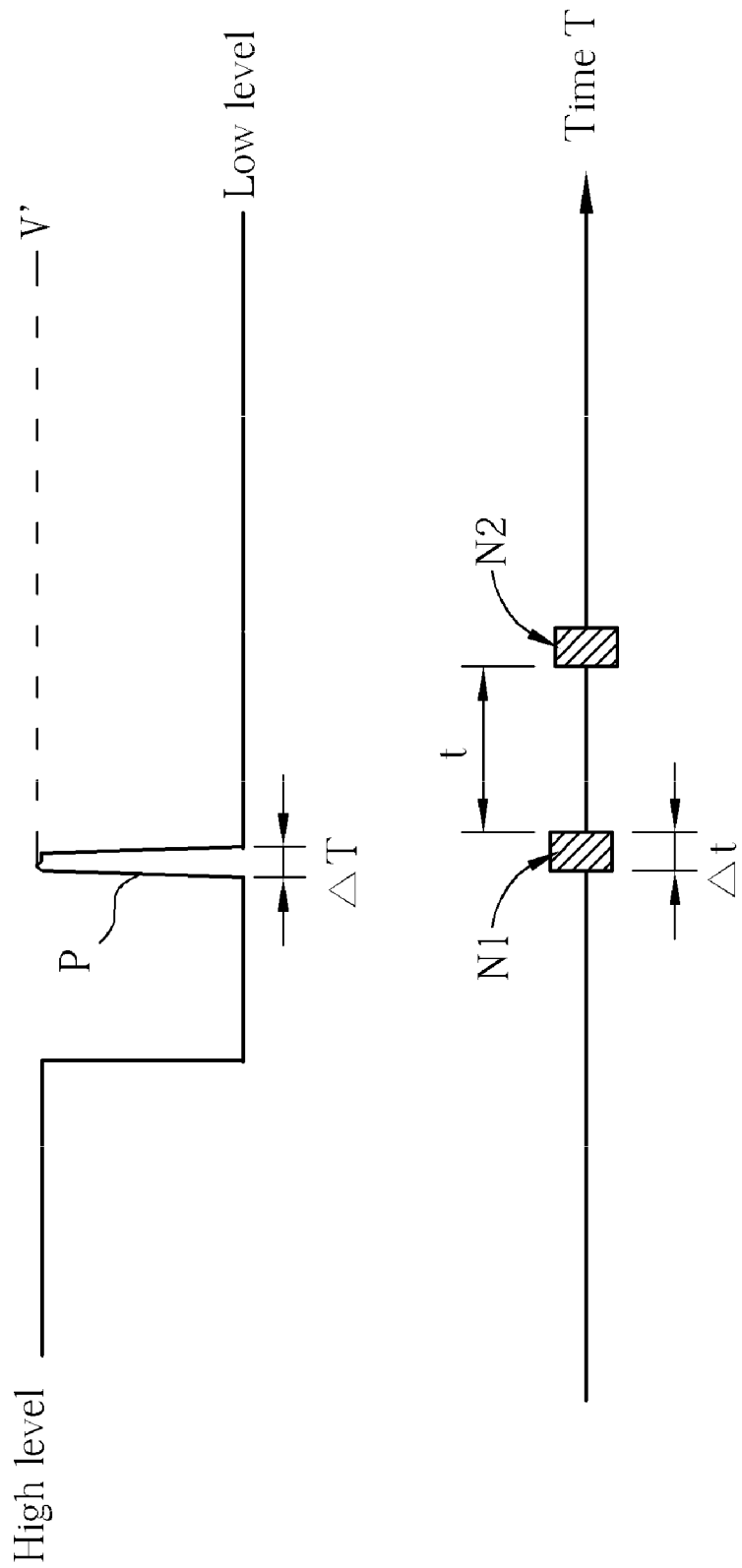
FIG. 3 is a diagram illustrating voltage detection of a limit switch of an optical disc drive according to a first embodiment of the present invention.

Please refer to FIG. 3, which is a diagram illustrating voltage detection of a limit switch of an optical disc drive according to a first embodiment of the present invention. A voltage of the limit switch of the optical disc drive at a high level representative of a release status of the limit switch is changed and is maintained at a low level after a disc loading process is completed by pressing the limit switch to activate the limit switch. The optical disc drive that has completed the disc loading process detects that the voltage of the limit switch is changed to the high level again, as shown by the dotted line in FIG. 3. It is possible that the voltage change may be generated due to a normal disc ejection command or an abnormal voltage bouncing P. To avoid misjudging the abnormal voltage bouncing P as the high level voltage generated due to the normal disc ejection command, the optical disc drive that has completed the disc loading process performs the sampling detection on the voltage of the limit switch according to an exemplary detecting method of the present invention and determines if the voltage is generated due to the normal disc ejection command, rather than executes the disc ejecting process immediately, after detecting that the voltage of the limit switch is at the high level.

When the abnormal voltage bouncing phenomenon occurs in the limit switch, a voltage bouncing period $\Delta T$ maintains 0-30 ms through actual measurements. However, one sampling period $\Delta t$ of the sampling detection on the voltage of the limit switch once needs 20 ms. As the sampling period $\Delta t$ is shorter than the voltage bouncing period $\Delta T$, an abnormal voltage may still be sampled within the voltage bouncing period $\Delta T$ if the sampling detection on the voltage of the limit switch is performed once. In order to avoid the incorrect sampled voltage generated by performing one single voltage sampling, the voltage of the limit switch is sampled predetermined times in this embodiment. In FIG. 3, although two voltage samplings N1 and N2 are taken as an example, this is not meant to be a limitation of the present invention. In other words, techniques which can avoid sampling the voltage within the voltage bouncing period $\Delta T$ by sampling the voltage predetermined times (i.e., more than twice) and adjusting a sampling interval t for sampling the voltage the predefined times to be fixed or unfixed fall within the scope of the present invention.

In this embodiment, after the disc loading action presses the limit switch to activate the limit switch for completing the disc loading process and maintaining the voltage at the low level, the optical disc drive samples the voltage of the limit switch the predetermined times rather than executes the disc ejecting process immediately when detecting that the voltage of the limit switch is changed to the high level again. When sampled voltages are all at the high level, it is thus confirmed that release of the limit switch has been activated, and the disc ejecting process is then executed. However, as long as a low voltage is found in the sampled voltages, it is determined that a high voltage is noise caused by voltage bouncing of the limit switch, the optical disc drive maintains the disc loaded status rather than executes the disc ejecting process in order to avoid misjudging that a disc ejecting process is needed.

Figure 4:
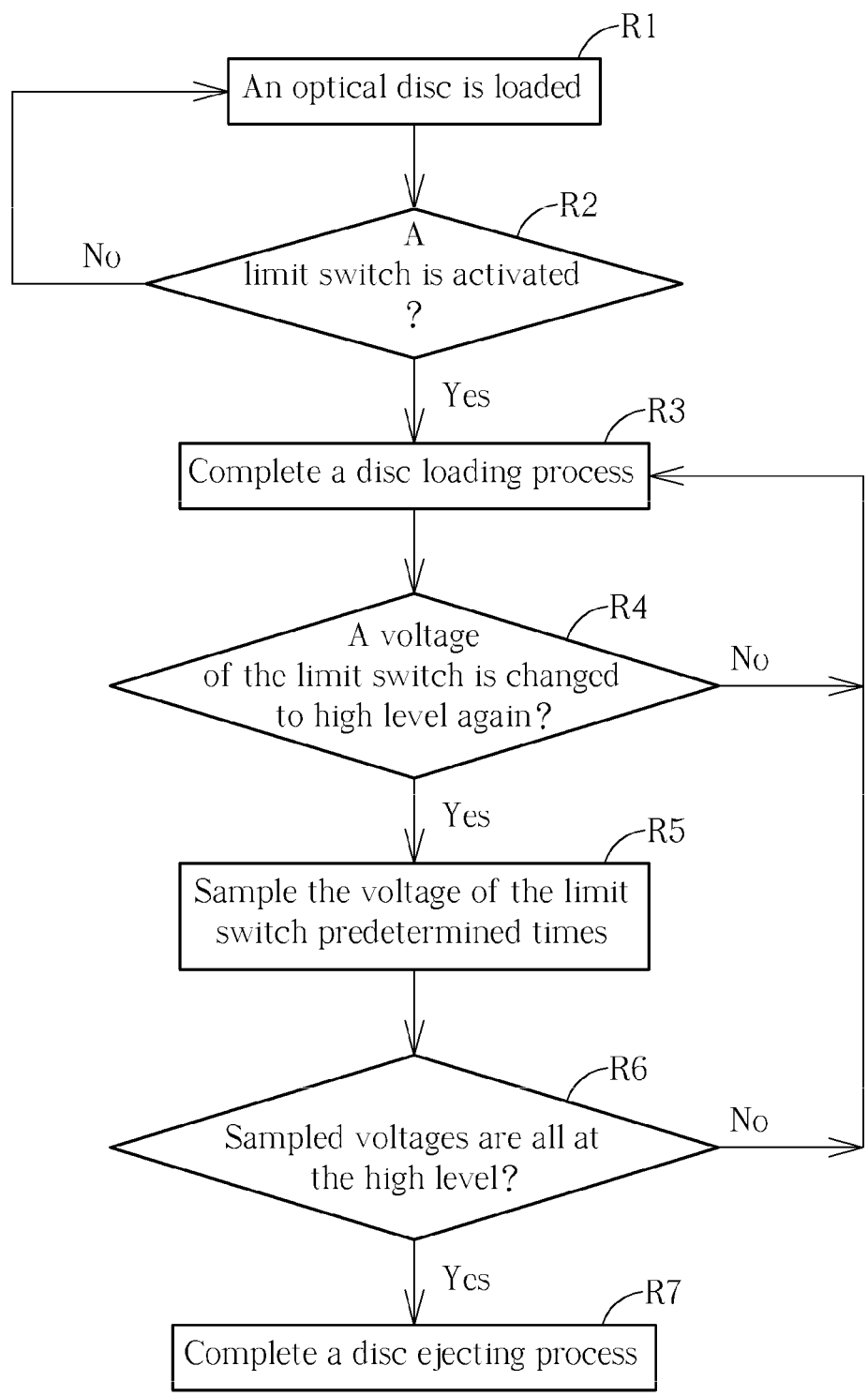
FIG. 4 is a flowchart of the exemplary detecting method for the limit switch of the optical disc drive according to the first embodiment of the present invention.

FIG. 4 is a flowchart of the exemplary detecting method for the limit switch of the optical disc drive according to the first embodiment of the present invention. The steps of confirming the activation of releasing the limit switch by sampling the voltage predefined times according to the exemplary detecting method of the present invention are described in detail as follows. First, in step R1, an optical disc is loaded by pushing the optical disc into an optical disc drive when a voltage of a limit switch of the optical disc drive is at a high level. In step R2, the flow checks if the limit switch is activated by detecting if the voltage of the limit switch is changed to a low level. If the voltage of the limit switch is still at the high level, the limit switch is not activated, and then the flow goes to step R1 to continue loading the optical disc. If the voltage of the limit switch is changed to the low level, the limit switch has been activated, and then the flow goes to step R3 to complete a disc loading process. In step R4, the flow detects if the voltage of the limit switch is changed to the high level again. If the voltage of the limit switch is not detected to be changed to the high level, the flow goes to step R3 to maintain a disc loaded status. If the voltage of the limit switch is detected to be changed to the high level, the flow goes to step R5 to sample the voltage of the limit switch predetermined times. In step R6, the flow detects if sampled voltages are all at the high level. If the sampled voltages are not all at the high level, meaning that an abnormal voltage bouncing occurs, it is determined that the limit switch is not released (i.e., the limit switch has no action), and the flow returns to step R3 to maintain the disc loaded status. If the sampled voltages are all at the high level, it is determined that the limit switch is released (i.e., the limit switch has action), and the flow goes to step R7 to complete the disc ejecting process.

Therefore, when detecting that the voltage of the limit switch is changed to the high level again, the exemplary detecting method according to the first embodiment of the present invention may utilize the optical disc drive, either a tray-type optical disc drive or a slot-in type optical disc drive, that has completed the disc loading process to sample the voltage of the limit switch predetermined times rather than execute the disc ejecting process immediately. When the sampled voltages are all at the high level, it is confirmed that release of the limit switch is activated. In this way, the objectives of preventing the optical disc drive from misjudging that a disc ejecting process is needed and enhancing the reliability of the optical disc drive are achieved.

Figure 5:
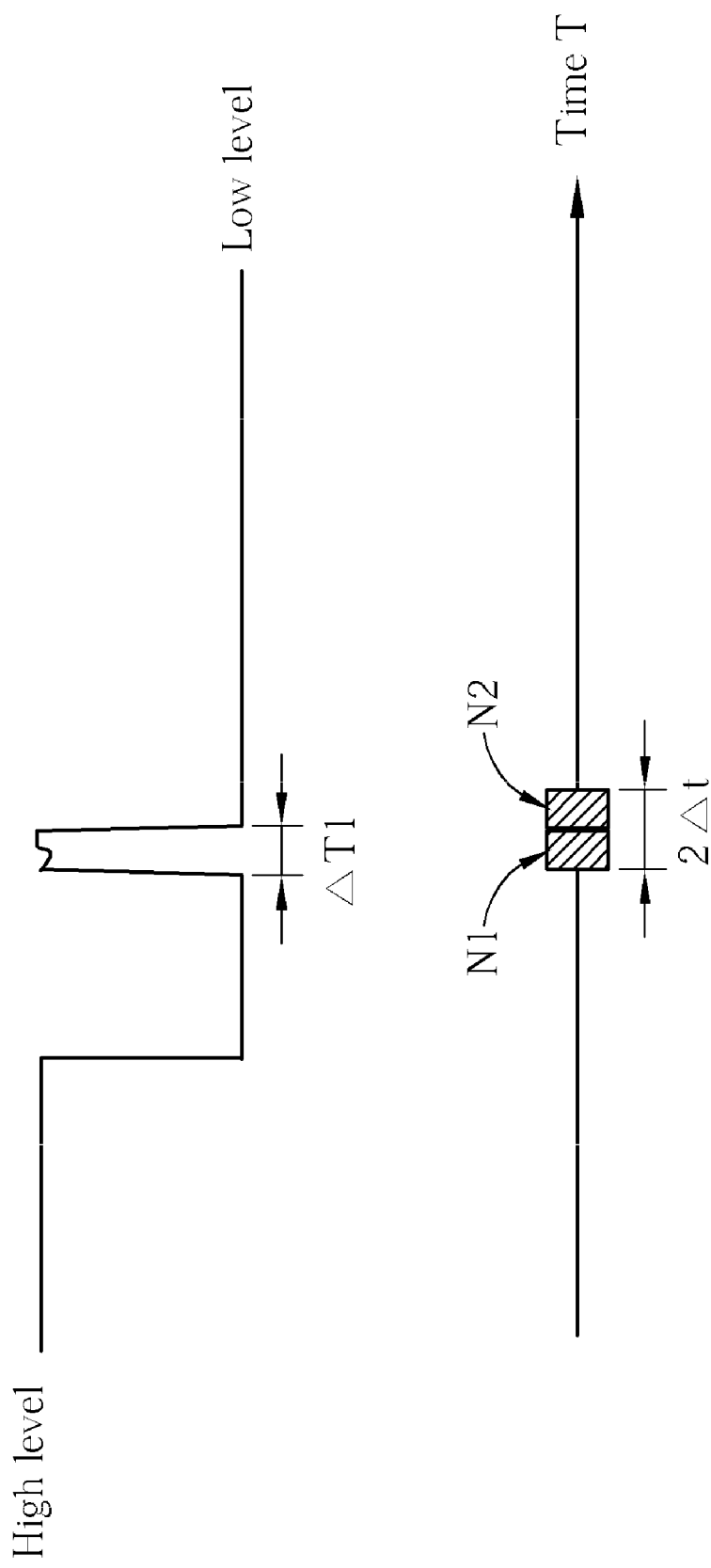
FIG. 5 is a diagram illustrating voltage detection of a limit switch of an optical disc drive according to a second embodiment of the present invention.

FIG. 5 is a diagram illustrating voltage detection of a limit switch of an optical disc drive according to a second embodiment of the present invention. Basically, the steps in the second embodiment are the same as those used for confirming the activation of releasing the limit switch by sampling the voltage the predetermined times in the first embodiment. However, though sampling the voltage more times in the first embodiment may enhance the detection correctness of the disc ejection, the detection time is inevitably increased to lower the efficiency of the optical disc drive. Based on the observation that the longest uninterrupted voltage bouncing period ΔT1 occurring in the limit switch of the optical disc drive is 30 ms through actual measurements, the second embodiment cancels the sampling interval for sampling the voltage the predetermined times in the first embodiment to therefore have no sampling interval between voltage samplings (i.e. t=0). By sampling the voltage the predetermined times continuously (e.g. the 20-ms voltage sampling N2 immediately follows the 20-ms voltage sampling N1) and making a total sampling period of sampling the voltage the predetermined times continuously longer than the longest uninterrupted voltage bouncing period 30 ms (i.e., 2Δt>ΔT1), the abnormal voltage bouncing may be detected rapidly with fewer voltage samplings and then the action of the limit switch can be correctly determined.

In addition, as the activation of the release of the limit switch is confirmed only when the sampled voltages are all at the high level in the first embodiment, the required detection time is longer. This embodiment checks if a sampled voltage is at the high level each time the voltage is sampled to obtain the sampled voltage. When a current sampled voltage is found having a non-high voltage, the first embodiment's condition where the sampled voltages are all at the high level is true. Hence, it is immediately confirmed that the abnormal voltage bouncing occurs in the limit switch. Thus, the disc loaded status is maintained, and the follow-up voltage sampling is stopped. Therefore, the determination of the action of the limit switch may be accelerated.

Figure 6:
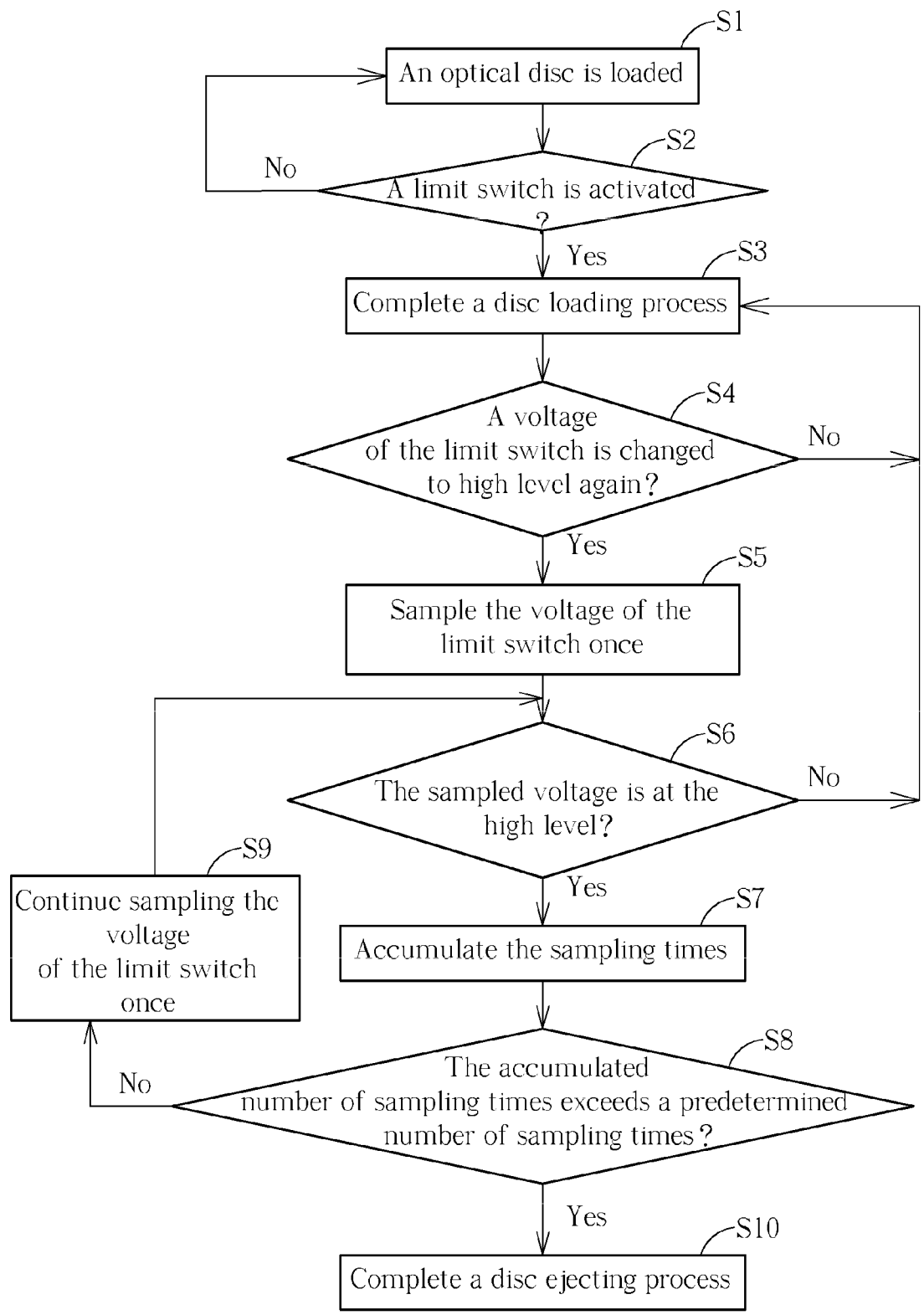
FIG. 6 is a flowchart of the exemplary detecting method for the limit switch of the optical disc drive according to the second embodiment of the present invention.

FIG. 6 is a flowchart of the exemplary detecting method for the limit switch of the optical disc drive according to the second embodiment of the present invention. The steps of confirming the activation of releasing the limit switch by sampling the voltage the predefined times continuously according to the exemplary detecting method of the present invention are described in detail as follows. As the steps S1-S4 in the second embodiment are the same as the steps R1-R4 in the first embodiment, further description is omitted for brevity. If the voltage of the limit switch is detected to be at the high level in step S4, the flow goes to step S5 to sample the voltage of the limit switch once. In step S6, the flow detects if the sampled voltage is at the high level. If the sampled voltage is not at the high level, it is determined that the limit switch is not released (i.e., the limit switch has no action), and the flow returns to step S3 to maintain the disc loaded status. If the sampled voltage is at the high level, the flows goes to step S7 to add one to the number of sampling times for accumulating the sampling times. In step S8, the flow checks whether the accumulated number of sampling times exceeds a predetermined number of sampling times. If the accumulated number of sampling times does not exceed the predetermined number of sampling times, the flow goes to step S9 to continue sampling the voltage of the limit switch once, and then returns to step S6 to continue detection. If the accumulated number of sampling times exceeds the predetermined number of sampling times, the flow goes to step S10 to complete the disc ejecting process.

Therefore, the exemplary detecting method according to the second embodiment of the present invention may make the total sampling period of sampling the voltage continuously longer than the longest uninterrupted voltage bouncing period by continuously sampling the voltage of the limit switch the predetermined times. In this way, the abnormal voltage bouncing may be detected rapidly with fewer voltage samplings. In addition, by checking the sampled voltages of the limit switch one by one, the disc ejection and follow-up voltage sampling are stopped as long as the sampled voltage at the low level is detected, which achieves the high detection efficiency of the optical disc drive.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A detecting method for a limit switch of an optical disc drive, comprising:
   (a) loading an optical disc when a voltage of the limit switch of the optical disc drive is at a high level;
   (b) detecting if the voltage of the limit switch is changed to a low level; if the voltage of the limit switch is still at the high level, going to step (a) to continue loading the optical disc; if the voltage of the limit switch is changed to the low level, going to step (c);
   (c) completing a disc loading process;
   (d) detecting if the voltage of the limit switch is changed to the high level again; if the voltage of the limit switch is not at the high level, going to step (c) to maintain a disc loaded status; if the voltage of the limit switch is at the high level, going to step (e);
   (e) sampling the voltage of the limit switch predetermined times and detecting if sampled voltages are all at the high level; if the sampled voltages are not all at the high level, going to step (c) to maintain the disc loaded status; if the sampled voltages are all at the high level, going to step (f); and
   (f) completing a disc ejecting process.

2. The detecting method for the limit switch of the optical disc drive of claim 1, wherein action of the limit switch is determined by detecting if the voltage of the limit switch is changed.

3. The detecting method for the limit switch of the optical disc drive of claim 1, wherein a sampling interval for sampling the voltage the predetermined times in step (e) is fixed or unfixed.

4. The detecting method for the limit switch of the optical disc drive of claim 1, wherein the step (e) samples the voltage the predetermined times continuously with no sampling interval between voltage samplings.

5. The detecting method for the limit switch of the optical disc drive of claim 4, wherein a total sampling period of sampling the voltage the predetermined times continuously is longer than a longest uninterrupted voltage bouncing period.

6. The detecting method for the limit switch of the optical disc drive of claim 4, wherein a number of the predetermined times for sampling the voltage continuously is two.

7. The detecting method for the limit switch of the optical disc drive of claim 1, wherein when the sampled voltages in step (e) are not all at the high level, it is determined that abnormal voltage bouncing occurs in the limit switch, and when the sampled voltages in step (e) are all at the high level, it is determined that the limit switch operates.

8. The detecting method for the limit switch of the optical disc drive of claim 1, wherein step (e) checks a sampled voltage each time the voltage is sampled to obtained the sampled voltage.

9. The detecting method for the limit switch of the optical disc drive of claim 8, wherein when the sampled voltage at a non-high level is detected, it is determined that the sampled voltages generated by sampling the voltage the predetermined times are not all at the high level.

10. The detecting method for the limit switch of the optical disc drive of claim 9, wherein as long as the sampled voltage at the non-high level is detected, follow-up voltage sampling is stopped immediately and step (c) is executed again to maintain the disc loaded status.

* * * * *